United States Patent
Sun

(10) Patent No.: US 11,761,197 B2
(45) Date of Patent: Sep. 19, 2023

(54) WALL MOUNTABLE BRACKET ASSEMBLY

(71) Applicant: Victaulic Company, Easton, PA (US)

(72) Inventor: Cong Sun, Bethlehem, PA (US)

(73) Assignee: VICTUALIC COMPANY, Easton, PA (US)

( * ) Notice: Subject to any disclaimer, the term of this patent is extended or adjusted under 35 U.S.C. 154(b) by 126 days.

(21) Appl. No.: 17/519,003

(22) Filed: Nov. 4, 2021

(65) Prior Publication Data

US 2022/0136233 A1    May 5, 2022

Related U.S. Application Data

(60) Provisional application No. 63/109,930, filed on Nov. 5, 2020.

(51) Int. Cl.
*E04B 1/41* (2006.01)
*F16B 5/00* (2006.01)
*E04B 1/21* (2006.01)

(52) U.S. Cl.
CPC ............ *E04B 1/4135* (2013.01); *E04B 1/215* (2013.01); *F16B 5/0036* (2013.01); *F16B 2200/10* (2018.08)

(58) Field of Classification Search
CPC ...... E04B 1/4135; E04B 1/215; F16B 5/0036; F16B 2200/10; F16B 5/02; F16B 13/141
See application file for complete search history.

(56) References Cited

U.S. PATENT DOCUMENTS

| | | | |
|---|---|---|---|
| 3,421,551 A | 1/1969 | Currier | |
| 4,848,043 A | 7/1989 | Harbeke | |
| 5,112,156 A * | 5/1992 | Boyer | F16B 21/088 403/287 |
| 5,452,551 A | 9/1995 | Charland et al. | |
| 5,970,670 A | 10/1999 | Hoffman | |
| 10,233,630 B1 * | 3/2019 | Francies, III | E04B 1/043 |
| 10,370,845 B2 * | 8/2019 | Francies, III | E04B 1/483 |
| 11,492,797 B2 * | 11/2022 | Recker | E04B 1/4114 |
| 2018/0347179 A1 * | 12/2018 | Kelly | E04B 1/41 |

FOREIGN PATENT DOCUMENTS

| | | |
|---|---|---|
| CN | 102155049 | 8/2011 |
| CN | 206722090 | 12/2017 |
| EP | 919672 | 7/2002 |
| EP | 3650607 | 5/2020 |

* cited by examiner

*Primary Examiner* — Patrick J Maestri
(74) *Attorney, Agent, or Firm* — Ballard Spahr LLP

(57) ABSTRACT

A bracket assembly isolates shear forces from fasteners to realize the full tensile load capability of the fasteners. The fasteners extend from a base plate and are embedded within a structure such as a poured concrete wall. Receptacles defined by the base plate receive bosses which extend from a mounting plate which overlies the base plate. The fasteners also retain the mounting plate to the base plate. Shear forces applied in the plane of the mounting plate are reacted between the bosses and the receptacles, the fasteners being isolated from the shear forces using oversized holes in the mounting plate to ensure that the fasteners experience primarily tensile loads.

27 Claims, 9 Drawing Sheets

WALL MOUNTABLE BRACKET ASSEMBLY

CROSS REFERENCE TO RELATED APPLICATIONS

This application is based upon and claims priority to U.S. Provisional Application No. 63/109,930, filed Nov. 5, 2020, which application is hereby incorporated by reference herein.

FIELD OF THE INVENTION

This invention concerns bracketry for supporting components on structures.

BACKGROUND

Supporting components such as pipe elements or heavy electrical or mechanical equipment on reinforced concrete structural elements such as walls and ceiling slabs within buildings presents various challenges. The challenges are more daunting when the structural elements comprise rebar and poured concrete. There are two common methods to connect steel structure (i.e. bracket) to concrete. One method is to install anchors after concrete is constructed. However, such post-installed concrete anchors will run the risk of hitting rebar when drilling the anchor bolt hole in concrete. Post-installed concrete anchors generally have low capacity and complex installation procedures. Additionally, such drilling may unacceptably weaken the concrete elements and possibly compromise the building's structural integrity. The other steel-to-concrete connection method is to embed steel plates in the concrete and weld bracket to the exposed steel plate after concrete is set. However this method would require tremendous welding on site. The heat from the welding can potentially damage the concrete behind the steel embed plate. To avoid post pour addition of bracketry one might consider pouring the concrete with the bracket integrated with the forms, however, this is considered largely impractical because nothing may project through the forms. There is clearly an opportunity to improve bracketry for reinforced concrete structures.

SUMMARY

In one aspect, the invention concerns a bracket assembly mountable on a wall. In an example embodiment, the bracket assembly comprises a base plate having an outer surface and a reverse surface oppositely disposed. At least one receptacle is attached to the reverse surface and extends in a direction away from the outer surface. The at least one receptacle comprises a receptacle sidewall oriented transversely to the base plate and a receptacle back wall oriented transversely to the receptacle sidewall. The receptacle sidewall and the receptacle back wall defining a cavity. A mounting plate is positioned in overlying relation with the base plate. A boss projects from the mounting plate. The boss comprises a boss sidewall oriented transversely to the mounting plate and a boss back wall oriented transversely to the boss sidewall. The boss sidewall and the boss back wall defining a recess. The boss is received within the cavity and therein defines a sidewall clearance between the boss sidewall and the receptacle sidewall. A fastener has a first end extending into the cavity and into the recess. The fastener has a second end projecting from the receptacle back wall in a direction away from the outer surface. The fastener securing the mounting plate to the base plate. The first end of the fastener extends into the cavity through a first receptacle hole in the receptacle back wall, and into the recess through a first boss hole in the boss back wall. The fastener when positioned in the first boss hole defining a fastener clearance between the fastener and the first boss hole. The sidewall clearance is smaller than the fastener clearance so an external load parallel to the mounting plate will be reacted primarily through contact between the boss sidewall and the receptacle sidewall.

In an example embodiment the first boss hole has a boss hole diameter that is greater than fastener diameter of the first end of the fastener. Further by way of example, an boss outer diameter is substantially equal to the receptacle inner diameter of the cavity. In a particular example the first end of the fastener comprises a threaded shaft. A first nut on the threaded shaft engages the receptacle back wall. A second nut on the threaded shaft engages the boss back wall within the recess. The receptacle back wall and the boss back wall are captured between the first and second nuts.

In an example embodiment the cavity has a cylindrical shape. Further by way of example, the boss has a cylindrical shape. In an example, the second end of the fastener comprises an enlarged head. Also by way of example, the mounting plate may further comprise a fixture attached thereto. The fixture may comprise a lug projecting transversely to the mounting plate or the fixture may comprise a beam projecting transversely to the mounting plate. Additionally the fixture may comprise a support strut projecting transversely to the mounting plate.

The invention further encompasses a bracket assembly mountable on a wall. In an example the bracket assembly comprises a base plate having an outer surface and a reverse surface oppositely disposed. A plurality of receptacles are attached to the reverse surface and extend in a direction away from the outer surface. Each receptacle comprises a receptacle sidewall oriented transversely to the base plate and a receptacle back wall oriented transversely to the receptacle sidewall. The receptacle sidewall and the receptacle back wall of each receptacle define a respective cavity. A mounting plate is positioned in overlying relation with the base plate. A plurality of bosses project from the mounting plate. Each boss comprises a boss sidewall oriented transversely to the mounting plate and a boss back wall oriented transversely to the boss sidewall to define a recess. Each boss is received within one of the cavities. Each fastener has a first end extending into one of the cavities and into one of the recesses. Each fastener has a second end projecting from a respective one of the back walls in a direction away from the outer surface. The fasteners secure the mounting plate to the base plate.

Further by way of example, the first end of each of the fasteners extends into a respective one the cavities through a respective one of the receptacle holes in a respective one of the receptacle back walls. Each first end extends into a respective one of the recesses through a respective one of the boss holes in each of the bosses. Each boss is sized in relation to the cavity in which it is received, and each boss hole in each boss is sized in relation to the first end of the fastener extending into the recess of the boss, such that an external load acting in the plane of the mounting plate will be reacted primarily through contact between the bosses and the sidewalls of the receptacles.

In a particular example, each one of the boss holes in each one of the bosses has a boss hole diameter that is greater than the fastener diameter of the fastener extending into each boss. Further by way of example, a boss outer diameter of each boss is substantially equal to an receptacle inner diameter of the cavity which receives the boss. In particular by way of example, the first end of each one of the fasteners comprises a threaded shaft. For each fastener, a first nut on the threaded shaft engages the receptacle back wall of the receptacle into which the fastener extends and for each fastener, a second nut on the threaded shaft engages the boss back wall within the recess into which the fastener extends. Each receptacle back wall and boss back wall are captured between the first and second nuts on each fastener.

In an example embodiment, each cavity has a cylindrical shape and each boss has a cylindrical shape. In a further example, the second end of each fastener comprises an enlarged head. By way of example the mounting plate may further comprise a fixture attached thereto. In a particular example the fixture comprises a lug projecting transversely to the mounting plate. In another example the fixture comprises a beam projecting transversely to the mounting plate. The fixture may further comprise a support strut projecting transversely to the mounting plate.

The invention also encompasses an installation. In an example the installation comprises a wall. At least one bracket assembly is mounted on the wall. By way of example the at least one bracket assembly comprises a base plate having an outer surface and a reverse surface oppositely disposed. At least one receptacle is attached to the reverse surface and extends in a direction away from the outer surface. The at least one receptacle comprises a receptacle sidewall oriented transversely to the base plate and a receptacle back wall oriented transversely to the receptacle sidewall. The receptacle sidewall and the receptacle back wall defines a cavity. A mounting plate is positioned in overlying relation with the base plate. A boss projects from the mounting plate. The boss comprises a boss sidewall oriented transversely to the mounting plate and a boss back wall oriented transversely to the boss sidewall to define a recess. The boss is received within the cavity. A fastener has a first end extending into the cavity and into the recess. The fastener has a second end projecting from the receptacle back wall and into the wall. The fastener secures the mounting plate to the base plate and the base plate to the wall. In an example the base plate is positioned flush with a surface of the wall. Further by way of example, the mounting plate is positioned flush with a surface of the wall. In an example embodiment the wall comprises concrete and the base plate is embedded within the concrete upon pouring of the wall.

In an example installation the first end of the fastener extends into the cavity through a receptacle hole in the receptacle back wall, and into the recess through a boss hole in the boss back wall. The boss is sized in relation to the cavity, and the boss hole in the boss is sized in relation to the fastener diameter such that an external load acting in parallel to the mounting plate will be reacted primarily through contact between the boss sidewall and the receptacle sidewall. In an example embodiment the boss hole diameter is greater than the fastener diameter. The boss outer diameter is substantially equal to the receptacle inner diameter of the cavity by way of example. Further by way of example, the first end of the fastener comprises a threaded shaft. A first nut on the threaded shaft engages the receptacle back wall. A second nut on the threaded shaft engages the boss back wall within the recess. The receptacle back wall and the boss back wall are captured between the first and second nuts. In an example embodiment the cavity has a cylindrical shape. Further by way of example the boss has a cylindrical shape. In a particular example, the second end of the fastener comprises an enlarged head.

In an example installation according to the invention, the mounting plate may further comprise a fixture attached thereto. By way of example the fixture may comprise a lug projecting transversely to the mounting plate or the fixture may comprise a beam projecting transversely to the mounting plate. In another example the fixture may comprise a support strut projecting transversely to the mounting plate.

DETAILED DESCRIPTION

Figure 1:
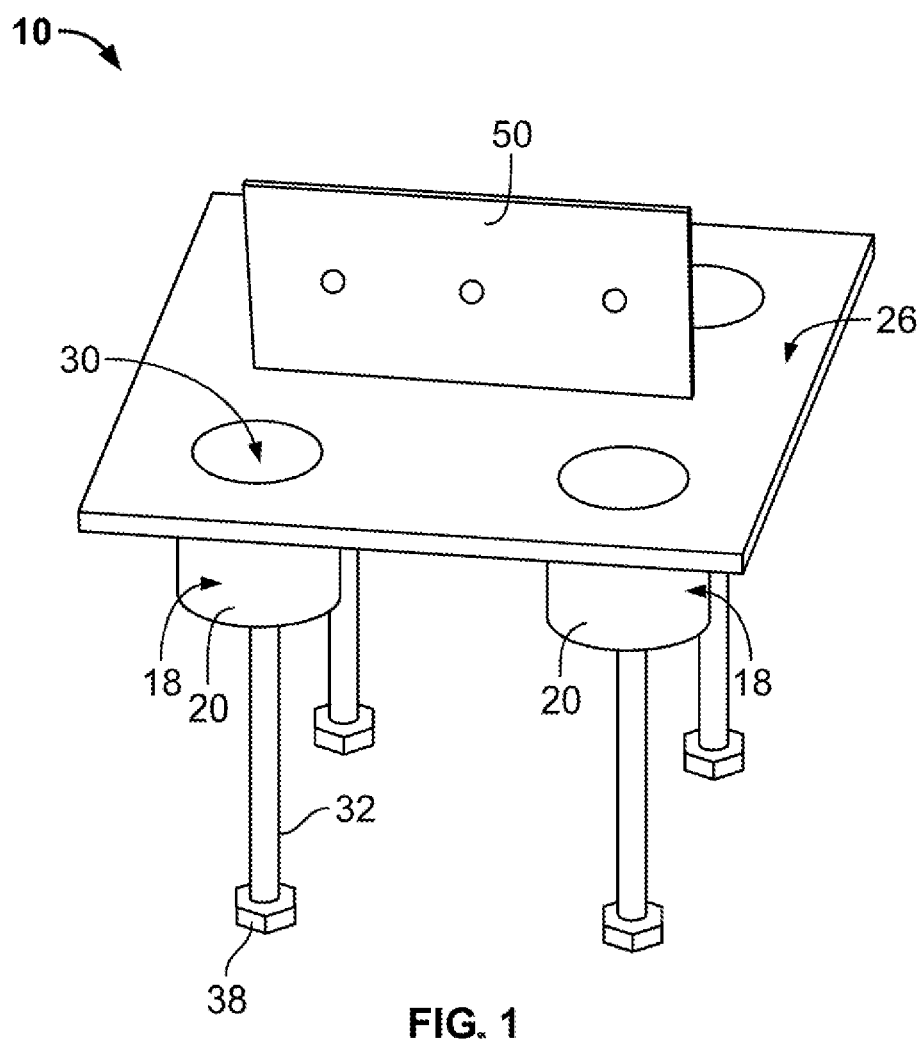
FIG. 1 is an isometric view of an example bracket assembly according to the invention.
Figure 2:
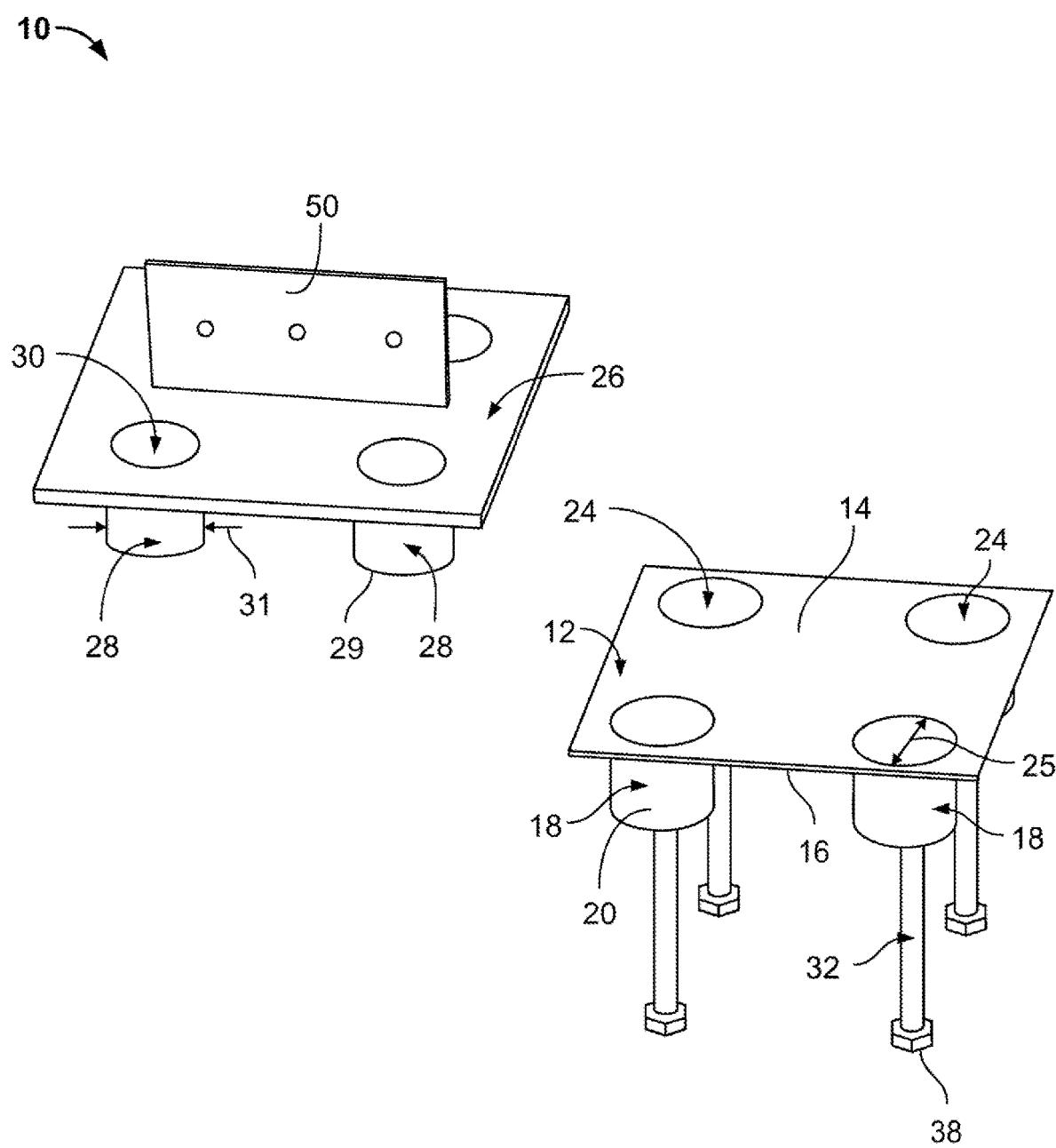
FIG. 2 is an exploded isometric view of the bracket assembly shown in FIG. 1.
Figure 3:
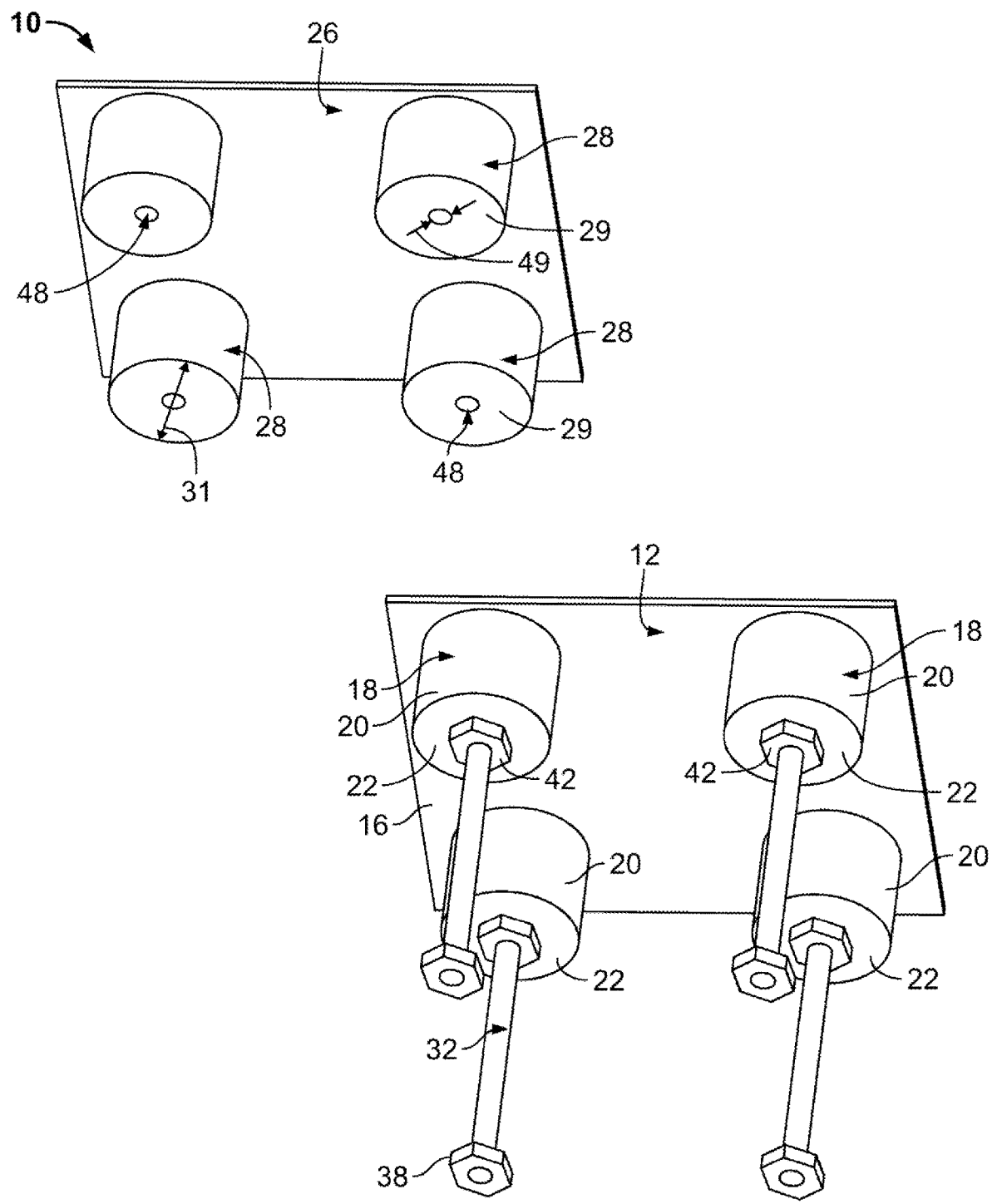
FIG. 3 is the exploded isometric view of the bracket assembly shown in FIG. 2 from underneath.
Figure 4:
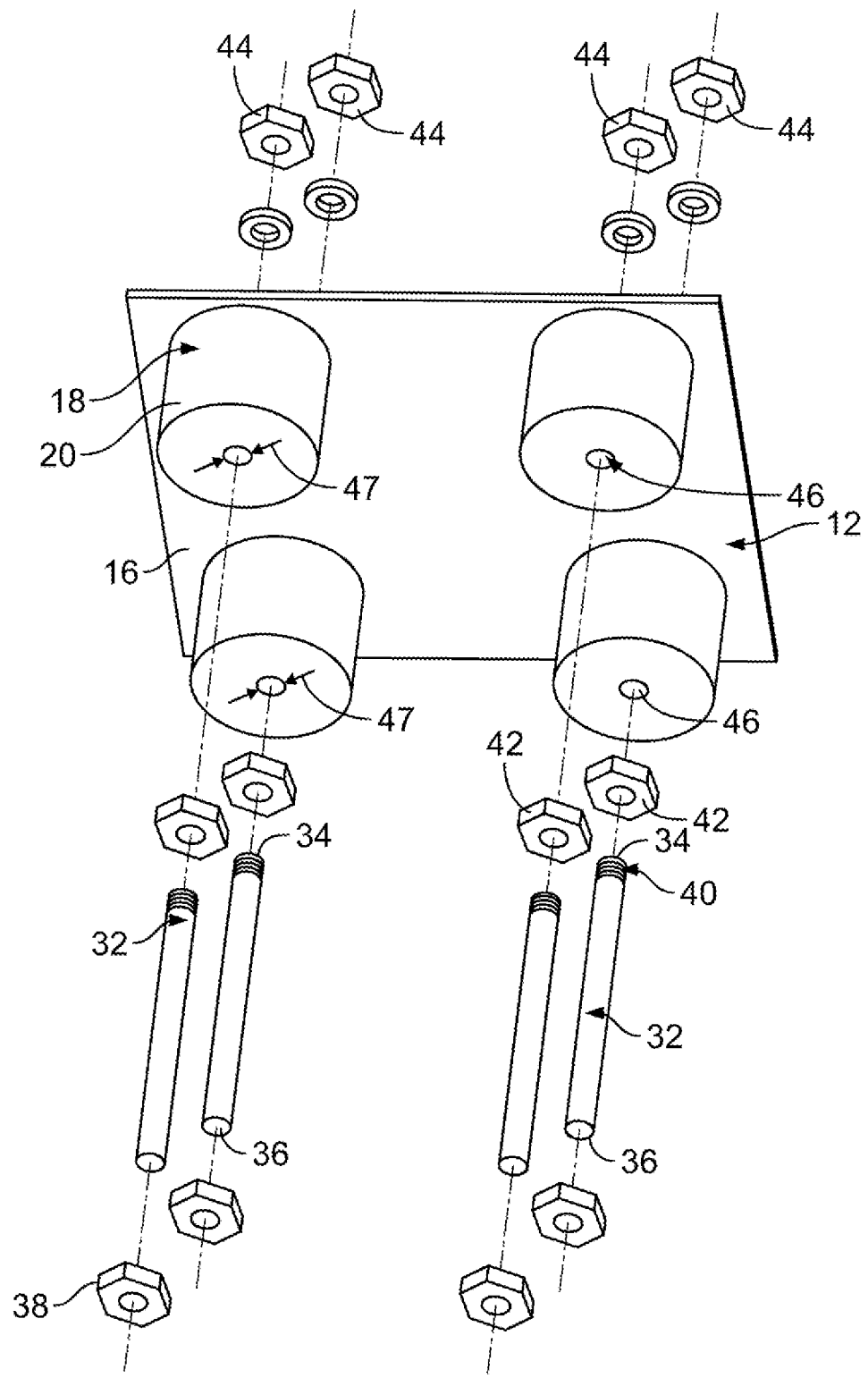
FIG. 4 is an exploded view of the base plate and fasteners shown in FIGS. 2 and 3.

FIGS. 1 through 5 show an example bracket assembly 10 according to the present disclosure. Bracket assembly 10 comprises a base plate 12 having an outer surface 14 (FIG. 2) and a reverse surface 16 (FIG. 3) oppositely disposed from one another. In this example bracket assembly 10 a plurality of receptacles 18 are attached to the reverse surface 16. Receptacles 18 extend in a direction away from the outer surface 14. As shown in FIG. 3, each receptacle 18 comprises a receptacle sidewall 20, oriented transversely to the base plate 12, and a receptacle back wall 22, oriented transversely to the receptacle sidewall 20. The receptacle sidewall 20 and the receptacle back wall 22 define a cavity 24. In this example, as shown in FIGS. 1 through 4, the receptacle sidewall 20 is continuous and defines a cavity 24 having a cylindrical shape. Although other shapes are feasible, the cylindrical shape is considered advantageous due to its symmetry about its longitudinal axis. This symmetry of the cavities 24 allow for a uniform distribution of shear loads imposed in the plane of the base plate 12 regardless of the direction of the shear loads. Each of the plurality of receptacles 18 defines a receptacle inner diameter 25 representing the internal width of the cavity 24. In examples wherein the plurality of receptacles 18 are not cylindrical, the receptacle inner diameter 25 can be defined by a receptacle internal width of the cavity 24.

Figure 5:
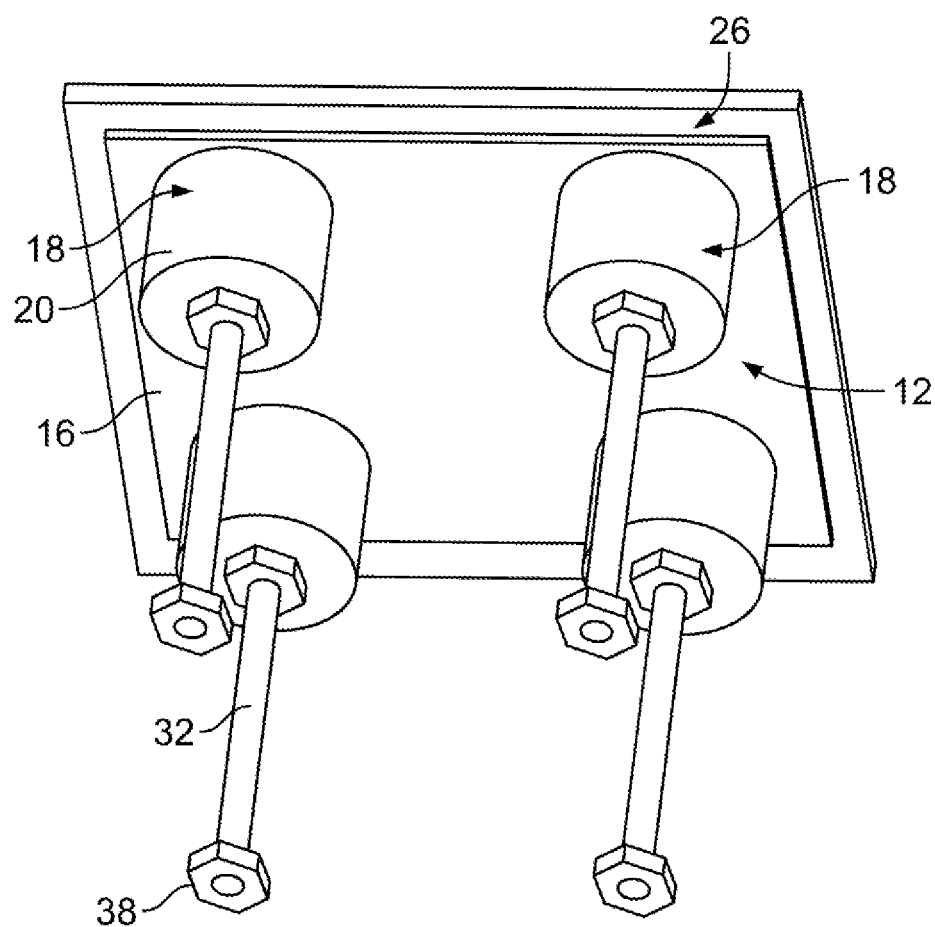
FIG. 5 is an isometric view of the example bracket assembly shown in FIG. 1 from underneath.
Figure 6:
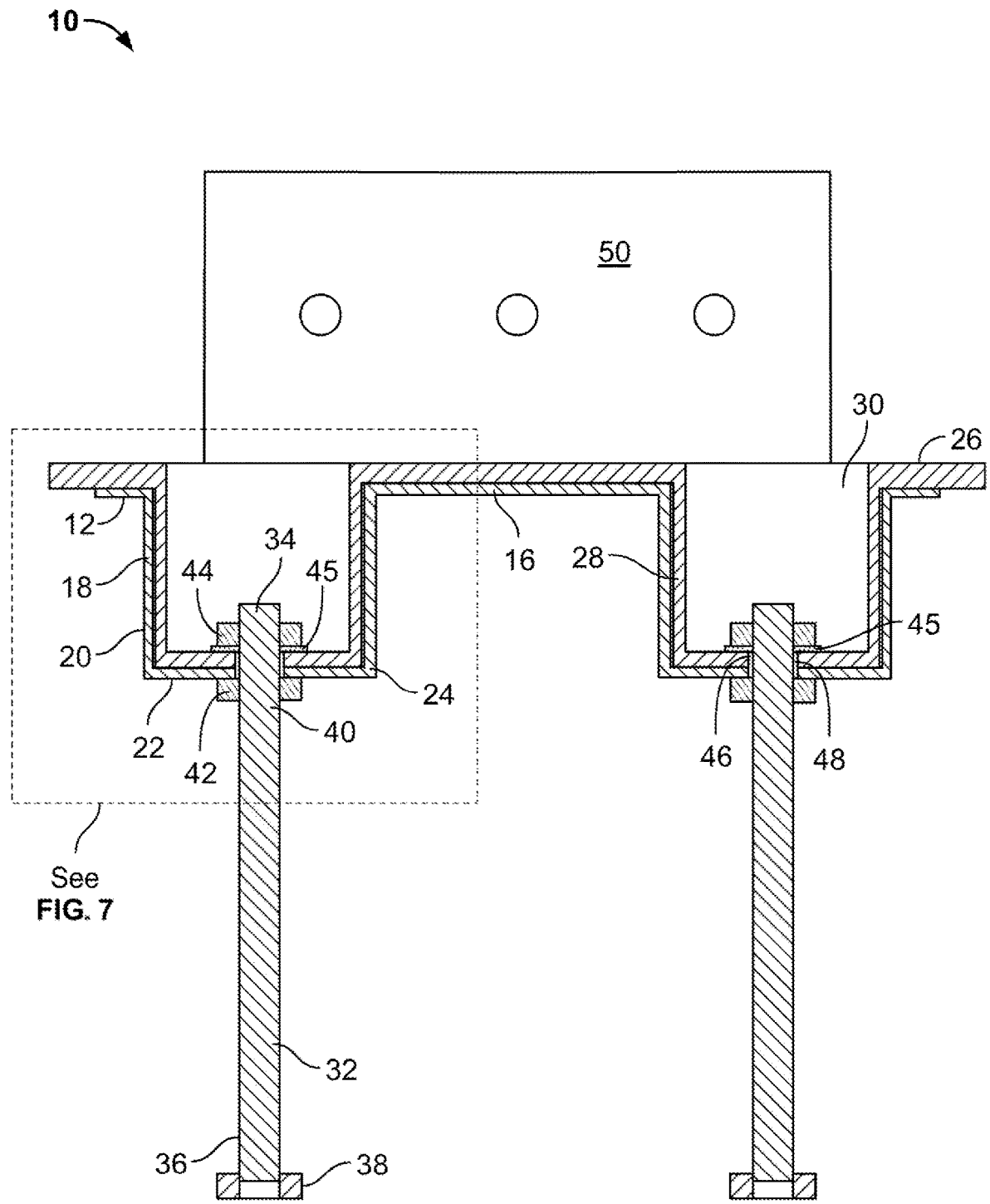
FIG. 6 is a sectional view of an example bracket assembly according to the invention.

A mounting plate 26 is positioned in overlying relation with the base plate 12. As shown in FIGS. 2 and 3, at least one boss (but in this example a plurality of bosses) 28, project from the mounting plate 26. As shown in FIGS. 1, 5 and 6, each boss 28 is received within a respective cavity 24 of the base plate 12. Each boss 28 includes a boss sidewall 27 and a boss back wall 29 that define a respective recess 30. As with the cavities 24 defined by receptacles 18, each boss 28 advantageously has a cylindrical cross sectional shape, again to distribute shear loads in the plane of the base plate 12 as explained below. Each of the plurality of boss 28 defines a boss outer diameter 31 representing the outer width of the boss 28. In examples wherein the plurality of boss 28 are not cylindrical, the boss outer diameter 31 can be defined by a boss external width.

As shown in FIGS. 1 through 6, assembly 10 also comprises a plurality of fasteners 32. Each fastener 32 has a first end 34 which extends into the cavity 24 of a respective receptacle 18, and further into the recess 30 defined by the boss 28 received within the cavity. Each fasteners 32 also has a second end 36 which projects from the back wall 22 of the receptacle 18 in a direction away from the outer surface 14 of the base plate 12. Each fastener is also defined by a fastener diameter 33 comprising the shaft width of the fastener 32. Advantageously, the second end 36 of each fastener 32 may comprise an enlarged head 38 to better enable fasteners 32 to secure assembly 10 to a structure, such as a wall, as described below. Fasteners 32 also secure the mounting plate 26 to the base plate 12. Attachment of the mounting plate 26 to the base plate 12 is effected in this example using a threaded shaft 40 which comprises the first end 34 of each fastener 32. A first nut 42 on each threaded shaft 40 engages the receptacle back wall 22 of each receptacle 18 and a second nut 44 on each threaded shaft 40 engages the boss back wall 29 within each recess 30. The back walls 22 and the bosses 28 are thus captured between the first and second nuts 42 and 44 on each shaft 40.

An object of the bracket assembly 10 according to the disclosure is to provide separate load paths for the shear and tensile forces imposed when the bracket assembly is mounted on a wall and supporting components such as pipe elements and the like. Bracket assemblies according to the disclosure are designed such that the fasteners 32 experience only tensile force (forces normal to the mounting and base plates 26 and 12), the shear forces (forces in the plane of the mounting and base plates 26 and 12) being reacted by interaction between the bosses 28 and the receptacles 18. By isolating the fasteners 32 from shear loads the bracket assemblies 10 according to the disclosure will be able to carry higher loads more efficiently using smaller and lighter components when compared with brackets wherein the fasteners are subjected to combined stresses in both shear and tension. The bracket assemblies 10 according to the disclosure will be effective even if total isolation of the fasteners 32 from shear loads is not practically achievable because any shear loads experienced by the fasteners in a practical design will be second order effects which may be largely ignored as of only minor significance.

Figure 7:
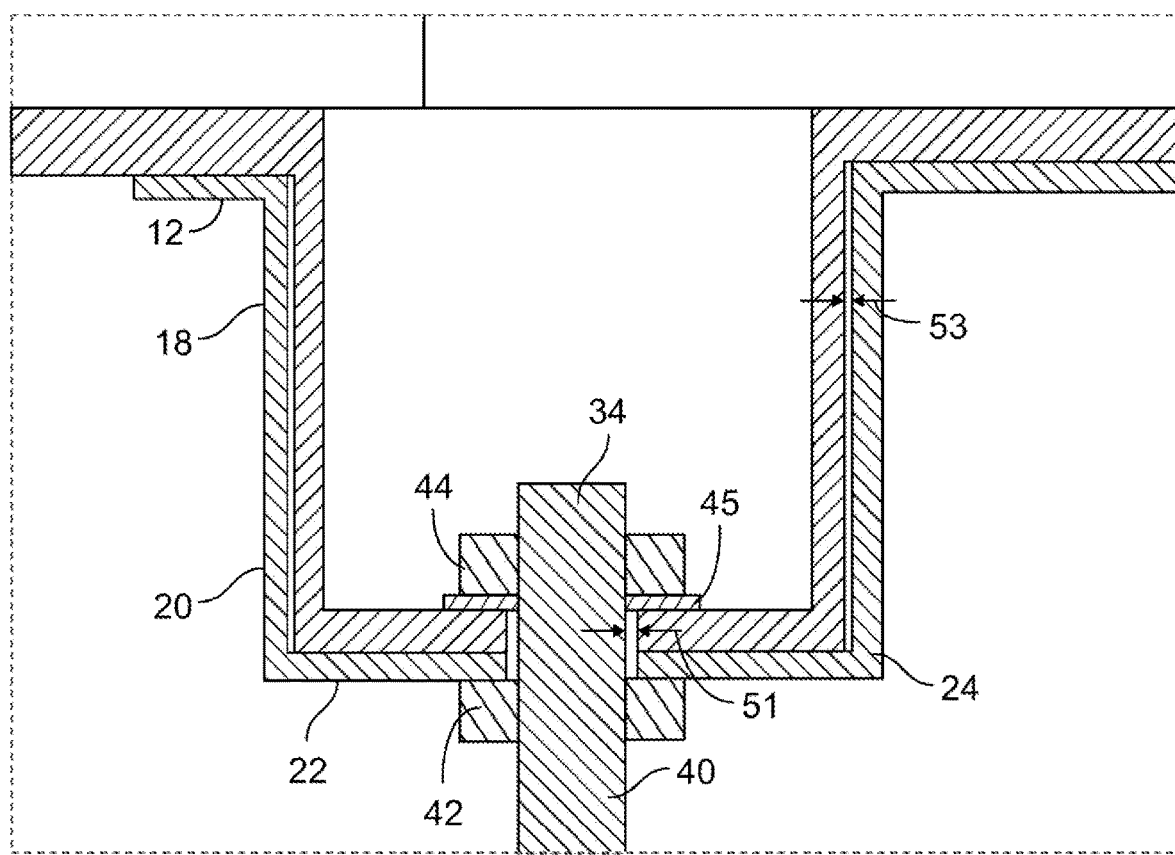
FIG. 7 is a detail of the sectional view shown in FIG. 6.

As shown in FIGS. 6 and 7, to achieve this objective, the first end 34 of each fastener 32 extends into the cavity 24 of each receptacle 18 through a first receptacle hole 46 in each receptacle's back wall 22. Each receptacle hole 46 is defined by a receptacle hole diameter 47. First ends 34 also extend into the recesses 30 of each boss 28 through a first boss hole 48 in each boss. Each first boss hole 48 is defined by a boss hole diameter 49. Each boss 28 is sized in relation to the cavity 24 in which it is received. The first boss hole 48 in each boss is sized in relation to the first end 34 of the fastener 32 which extends through it. The sizing of bosses 28 and first boss holes 48 is such that an external load acting in the plane of the mounting plate 26 will be reacted primarily through contact between the bosses 28 and the sidewalls 20 of the receptacle 18. This effect is achieved by sizing each first boss hole 48 to have a greater diameter than a diameter of the first ends 34 of each fastener 32. The difference between the boss hole diameter 49 and the fastener diameter 33 defines a fastener clearance 51 (See FIG. 7). The effect will be further augmented if the outer diameter (boss outer diameter 31) of each boss 28 is substantially equal to the inner diameter (receptacle inner diameter 25) of the cavity 24 in which it is received. In one example, the receptacle hole diameter 47 is equal to the boss hole diameter 49. The difference between the boss outer diameter 31 and the receptacle inner diameter 25 comprises a sidewall clearance 53. The term "substantially equal" as used in this specification means that the diameters may be close enough such that a boss 28 is not prevented from being received within a respective cavity 24 of a receptacle 18. The sidewall clearance 53 is smaller than the fastener clearance 51 such that external loads acting in the plane of the mounting plate 26 will be reacted primarily through contact between the boss sidewall 27 and the receptacle sidewall 20. It is also advantageous to position a low friction element, such as a low friction washer 45 comprising a low friction material or having a low friction coating, such as polytetrafluoroethylene, between second nut 44 and the boss back wall 29 to further reduce shear load transfer at the bolted interface.

Figure 8:
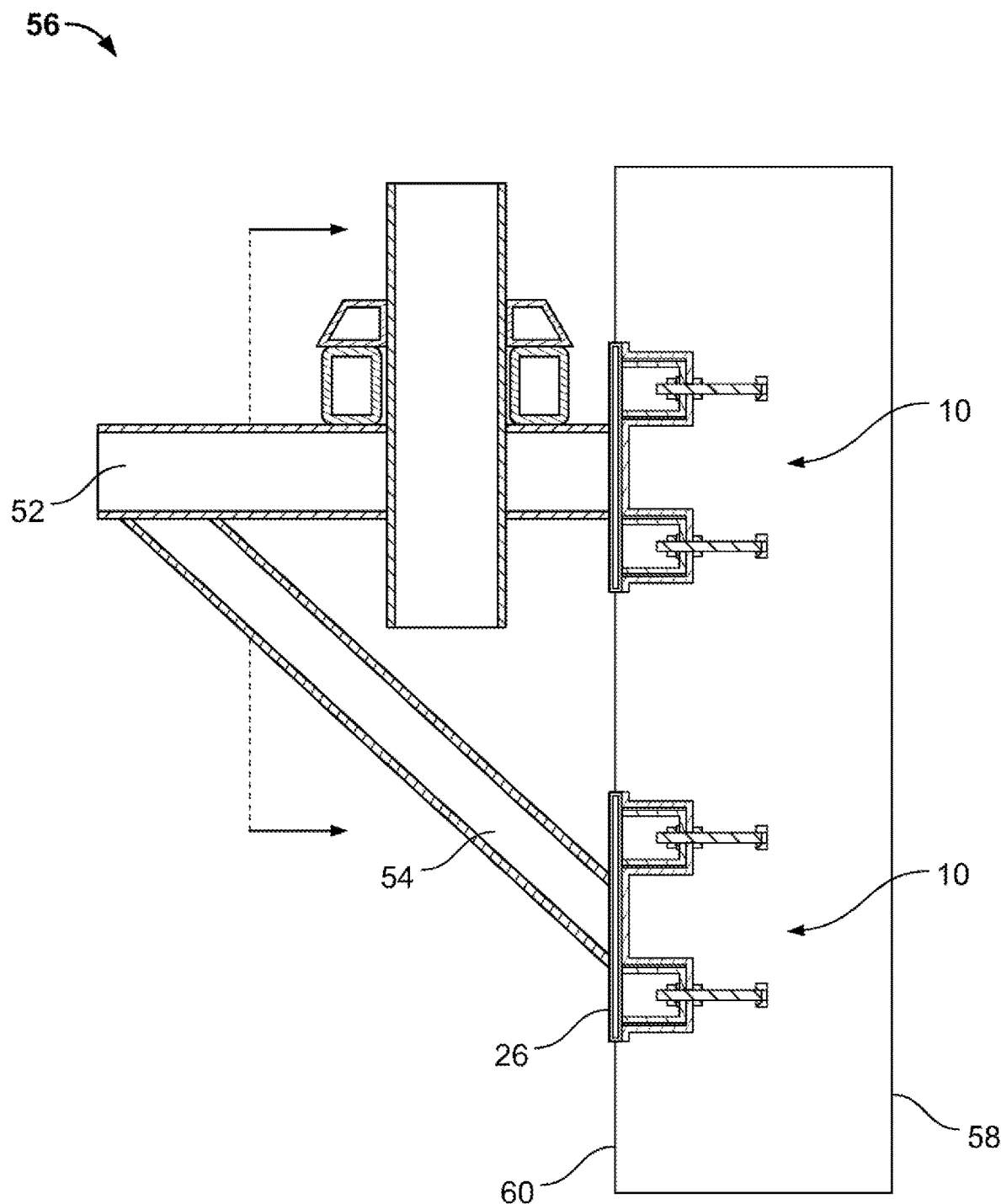
FIG. 8 is a sectional view of an example installation according to the invention.

FIGS. 6 and 8 illustrate further embodiments of bracket assemblies 10 according to the invention which comprise various types of fixtures attached to mounting plate 26. As shown in FIG. 6, the mounting plate 26 may further comprise a lug 50 projecting transversely to the mounting plate. In FIG. 8, the fixtures comprise a beam 52 projecting transversely to the mounting plate of one bracket assembly 10, and a support strut 54 projecting transversely to the mounting plate of a second bracket assembly according to the invention. Other types of fixtures may of course be attached to bracket assembly 10.

Figure 9:
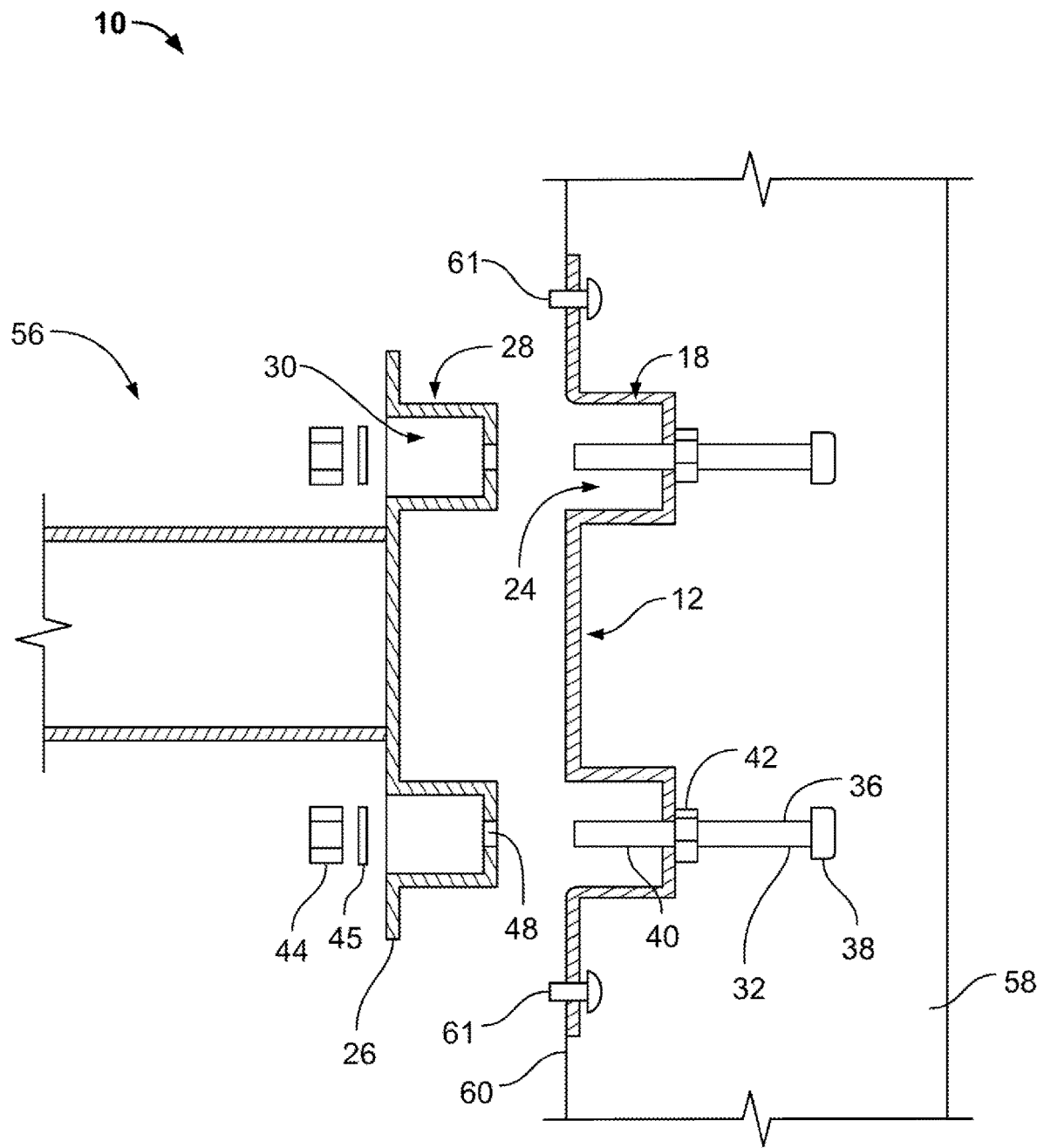
FIG. 9 is a sectional view illustrating assembly of an example installation according to the invention.

FIGS. 8 and 9 further illustrate an installation 56, also encompassed by the invention. Installation 56 comprises a bracket assembly 10 as described above and a wall 58, for example, a shear wall of a building (not shown). In the example installation shown in FIG. 9, the wall 58 comprises concrete and the base plate 12 is embedded within the concrete upon pouring of the wall 58. The enlarged heads 38 of the fasteners 32 provide enhanced engagement with the concrete to increase the maximum allowable fastener tension force. Fasteners 32 are retained to the base plate 12 using the second nuts 44 during the pour, and these nuts are removed before the bosses 28 of mounting plate 26 are inserted into the cavities 24 of receptacles 18 to mount the assembly 10 on the wall 58. The low friction elements, washers 45 are then placed on the threaded shafts 40 and the second nuts 44 are then torqued down on the threaded shafts 40 within the boss recesses 30 to secure the mounting plate 26 to the base plate 12. It is advantageous to position the base plate 12 flush with a surface 60 of the wall 58 (FIG. 9). The example shown in FIG. 9 may further include formwork screws 61 to affix the base plate 12 to formwork (not shown) while the concrete wall 58 is poured. In the embodiment shown in FIG. 8, the mounting plate 26 is positioned flush with the surface 60 of the wall 58.

The present disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

What is claimed is:

1. A bracket assembly mountable on a wall, said bracket assembly comprising:

a base plate having an outer surface and a reverse surface oppositely disposed;
at least one receptacle attached to said reverse surface and extending in a direction away from said outer surface, said at least one receptacle comprising a receptacle sidewall oriented transversely to said base plate and a receptacle back wall oriented transversely to said sidewall, said receptacle sidewall and said receptacle back wall defining a cavity;
a mounting plate positioned in overlying relation with said base plate;
a boss projecting from said mounting plate, said boss comprising a boss sidewall and a boss back wall, said boss sidewall and said boss back wall defining a recess, said boss being received within said cavity and having a sidewall clearance between said receptacle sidewall and said boss sidewall;
a fastener having a first end extending into said cavity and into said recess, said fastener having a second end projecting from said receptacle back wall away from said outer surface, said fastener securing said mounting plate to said base plate.

2. The bracket assembly according to claim 1, wherein said fastener includes an enlarged head at said second end.

3. The bracket assembly according to claim 2, wherein:
said first end of said fastener extends into said recess through a first boss hole in said boss, said first boss hole having a boss hole diameter;
wherein said fastener has a fastener diameter, wherein the difference between said fastener diameter and said boss hole diameter comprises a fastener clearance; and
wherein said sidewall clearance is smaller than said fastener clearance such that an external load acting in a plane of said mounting plate will be reacted primarily through contact between said boss sidewall and said receptacle sidewall.

4. The bracket assembly according to claim 3, wherein said sidewall clearance is substantially zero.

5. The bracket assembly according to claim 3, wherein:
said boss further includes a first receptacle hole on said boss back wall, said first receptacle hole having a receptacle hole diameter;
said first end of said fastener comprises a threaded shaft;
a first nut on said threaded shaft engages said receptacle back wall;
a second nut on said threaded shaft engages said boss back wall within said recess, said receptacle back wall and said boss back wall being captured between said first and second nuts.

6. The bracket assembly according to claim 5, further comprising a low friction washer positioned between said second nut and said boss back wall.

7. The bracket assembly according to claim 1, wherein said boss has a cylindrical shape and said at least on receptacle has a cylindrical shape.

8. The bracket assembly according to claim 1, wherein said mounting plate further comprises a fixture attached to said outer surface.

9. The bracket assembly according to claim 8, wherein said fixture comprises a lug projecting transversely to said mounting plate.

10. The bracket assembly according to claim 8, wherein said fixture comprises a beam projecting transversely to said mounting plate.

11. The bracket assembly according to claim 8, wherein said fixture comprises a support strut projecting transversely from said mounting plate.

12. A bracket assembly mountable on a wall, said bracket assembly comprising:
a base plate having an outer surface and a reverse surface oppositely disposed;
a plurality of receptacles attached to said reverse surface and extending in a direction away from said outer surface, each said plurality of receptacles comprising a receptacle sidewall oriented transversely to said base plate and a receptacle back wall oriented transversely to said receptacle sidewall, said receptacle sidewall and said receptacle back wall of each said receptacle defining a respective cavity;
a mounting plate positioned in overlying relation with said base plate;
a plurality of bosses projecting from said mounting plate, each of said plurality of bosses comprising a boss sidewall and a boss back wall, said boss sidewall and said boss back wall defining a recess, each of said plurality of bosses being received within one of said cavities and having a sidewall clearance between said receptacle sidewall and said boss sidewall; and
a plurality of fasteners, each said fastener having a first end extending into one of said cavities through a first receptacle hole and into one of said recesses through a first boss hole, each of said plurality of fasteners having a fastener diameter, each of said plurality of fasteners having a second end projecting from one of said receptacle back walls away from said outer surface, said fasteners securing said mounting plate to said base plate;
wherein each of said bosses is sized in relation to said cavity in which it is received, and said boss hole in each of said plurality of bosses is sized in relation to said fastener diameter, such that an external load acting in a plane of said mounting plate will be reacted primarily through contact between said bosses and said sidewalls of said receptacles.

13. The bracket assembly according to claim 12, wherein each of said boss holes comprise a boss hole diameter;
wherein the difference between said fastener diameter and said boss hole diameter comprises a fastener clearance; and
wherein said sidewall clearance is smaller than said fastener clearance.

14. The bracket assembly according to claim 13, wherein each one of said boss holes in each one of said bosses has a boss hole diameter that is greater than said fastener diameter.

15. The bracket assembly according to claim 12, wherein each of said plurality of bosses has a cylindrical shape and each of said plurality of receptacles has a cylindrical shape.

16. The bracket assembly according to claim 15, wherein each of said plurality of bosses has a boss outer diameter;
wherein each of said plurality of receptacles has a receptacle inner diameter; and
wherein each of said boss outer diameters is substantially equal to each of said receptacle inner diameters of said cavity which receives said boss.

17. The bracket assembly according to claim 12, wherein:
each of said plurality of bosses further includes a first receptacle hole on said boss back wall, said first receptacle hole having a receptacle hole diameter;
wherein said first end of said fastener comprises a threaded shaft;
a first nut on said threaded shaft engages said receptacle back wall;

a second nut on said threaded shaft engages said boss back wall within said recess, said receptacle back wall and said boss back wall being captured between said first and second nuts.

18. The bracket assembly according to claim 17, further comprising:
a low friction washer positioned between said second nut and said boss back wall.

19. The bracket assembly according to claim 12, wherein said mounting plate further comprises a fixture attached to said outer surface.

20. The bracket assembly according to claim 19, wherein said fixture comprises a lug projecting transversely to said mounting plate.

21. The bracket assembly according to claim 19, wherein said fixture comprises a beam projecting transversely to said mounting plate.

22. The bracket assembly according to claim 19, wherein said fixture comprises a support strut projecting transversely from said mounting plate.

23. An installation, said installation comprising:
a wall;
at least one bracket assembly mounted on said wall, said at least one bracket assembly comprising:
a base plate having an outer surface and a reverse surface oppositely disposed;
at least one receptacle attached to said reverse surface and extending in a direction away from said outer surface, said at least one receptacle comprising a receptacle sidewall oriented transversely to said base plate and a receptacle back wall oriented transversely to said sidewall, said receptacle sidewall and said receptacle back wall defining a cavity;
a mounting plate positioned in overlying relation with said base plate;
a boss projecting from said mounting plate, said boss comprising a boss sidewall and a boss back wall, said boss sidewall and said boss back wall defining a recess, said boss being received within said cavity and having a sidewall clearance between said receptacle sidewall and said boss sidewall;
a fastener having a first end extending into said cavity and into said recess, said fastener having a second end projecting from said receptacle back wall away from said outer surface, said fastener securing said mounting plate to said base plate.

24. The installation according to claim 23, wherein:
said first end of said fastener extends into said recess through a first boss hole in said boss, said first boss hole having a boss hole diameter;
wherein said fastener has a fastener diameter, wherein the difference between said fastener diameter and said boss hole diameter comprises a fastener clearance; and
wherein said sidewall clearance is smaller than said fastener clearance such that an external load acting in a plane of said mounting plate will be reacted primarily through contact between said boss sidewall and said receptacle sidewall.

25. The installation according to claim 23, wherein said base plate is positioned flush with a surface of said wall.

26. The installation according to 23, wherein said wall comprises concrete and said base plate is embedded within said concrete upon pouring of said wall.

27. The installation according to claim 23, wherein said mounting plate further comprises one of a lug projecting transversely to said mounting plate, a beam projecting transversely to said mounting plate or a support strut projecting transversely from said mounting plate.

\* \* \* \* \*